(12) United States Patent
Chen et al.

(10) Patent No.: US 11,943,105 B2
(45) Date of Patent: Mar. 26, 2024

(54) DYNAMIC MANAGEMENT OF APPLICATION SERVERS ON NETWORK EDGE COMPUTING DEVICE

(71) Applicant: NOKIA TECHNOLOGIES OY, Espoo (FI)

(72) Inventors: Jiongxuan Chen, Shandong (CN); Zhi Wang, Shandong (CN); Yigang Cai, Naperville, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 458 days.

(21) Appl. No.: 17/252,101

(22) PCT Filed: Jun. 15, 2018

(86) PCT No.: PCT/CN2018/091667
§ 371 (c)(1),
(2) Date: Dec. 14, 2020

(87) PCT Pub. No.: WO2019/237363
PCT Pub. Date: Dec. 19, 2019

(65) Prior Publication Data
US 2021/0258217 A1    Aug. 19, 2021

(51) Int. Cl.
*G06F 15/173*   (2006.01)
*H04L 41/0816*   (2022.01)
*H04L 67/10*   (2022.01)

(52) U.S. Cl.
CPC .......... *H04L 41/0816* (2013.01); *H04L 67/10* (2013.01)

(58) Field of Classification Search
CPC ..... H04L 41/0816; H04L 67/10; H04L 67/01; H04L 65/80; H04L 65/1016; H04L 65/1063; H04L 65/1069; H04L 67/34
(Continued)

(56) References Cited

U.S. PATENT DOCUMENTS

2010/0111079 A1    5/2010 Duffy et al.
2012/0311129 A1*  12/2012 Steuer ................. G06F 11/3452
                                                  709/224
(Continued)

FOREIGN PATENT DOCUMENTS

CN    103297507 A    9/2013
CN    105027499 A    11/2015
(Continued)

OTHER PUBLICATIONS

Extended European Search Report dated Jan. 20, 2022 corresponding to European Patent Application No. 18922800.0.
(Continued)

*Primary Examiner* — Kaylee J Huang
(74) *Attorney, Agent, or Firm* — SQUIRE PATTON BOGGS (US) LLP

(57) ABSTRACT

Embodiments of the present disclosure relate to a method, apparatus, device and computer readable storage media for management of application servers network edge computing device and a method, apparatus, device and computer readable storage media for performing management operation related to application servers network edge computing device. In example embodiments, at a management function module, a calling function deployment command is transmitted to a network edge computing device to deploy a calling function instance thereon, the calling function instance being configured to connect with application servers for respective applications and handle communications between terminal devices and the application server. A management command for application servers on the network edge computing device is transmitted to at least one of the network edge computing device and the calling function instance, in response to a network condition meeting one of predetermined management policies. In this way, the strict (Continued)

latency requirement of particular applications can be met and resources can be utilized efficiently.

18 Claims, 8 Drawing Sheets

(58) Field of Classification Search
USPC .......................................... 709/224, 223, 226
See application file for complete search history.

(56) References Cited

U.S. PATENT DOCUMENTS

| | | | |
|---|---|---|---|
| 2012/0311138 A1* | 12/2012 | Inamdar | ................ H04L 43/04 709/224 |
| 2014/0134978 A1 | 5/2014 | Zitnik et al. | |
| 2014/0330976 A1* | 11/2014 | van Bemmel | ...... H04L 67/1001 709/226 |
| 2015/0058459 A1* | 2/2015 | Amendjian | ............. H04L 41/20 709/223 |
| 2016/0224360 A1* | 8/2016 | Wagner | ............... G06F 9/45558 |
| 2017/0093970 A1* | 3/2017 | El-Charif | ............ H04L 41/0896 |
| 2017/0366618 A1 | 12/2017 | Vrzic et al. | |
| 2018/0041897 A1 | 2/2018 | Prasad et al. | |
| 2018/0060051 A1* | 3/2018 | Ramalingam | ........... H04L 67/34 |
| 2019/0045335 A1* | 2/2019 | Jin | ....................... H04W 88/02 |

FOREIGN PATENT DOCUMENTS

| | | | | |
|---|---|---|---|---|
| CN | 105794177 | A | | 7/2016 |
| CN | 105975261 | A | | 9/2016 |
| CN | 107113294 | A | | 8/2017 |
| CN | 107852608 | A | | 3/2018 |
| CN | 108156212 | A | * | 6/2018 ......... H04L 67/1002 |
| EP | 3 286 946 | A1 | | 2/2018 |
| WO | 2017/100640 | A1 | | 6/2017 |
| WO | WO 2017/214821 | A1 | | 12/2017 |
| WO | WO 2017/220158 | A1 | | 12/2017 |
| WO | WO 2018/024328 | A1 | | 2/2018 |

OTHER PUBLICATIONS

International Search Report & Written Opinion dated Mar. 6, 2019 corresponding to International Patent Application No. PCT/CN2018/091667.
First Examination Report dated Jan. 4, 2022 corresponding to Indian Patent Application No. 202047056733.
Chinese Office Action corresponding to CN Application No. 201880095941.4, dated Jun. 1, 2023.
Notification of First Office Action dated Jan. 19, 2023 corresponding to Chinese Patent Application No. 201880095941.4, with Search Report.
Lu Huazhang et al., "Standardization Progress and Case Analysis of Edge Computing," Journal of Computer Research and Development, 55(3), pp. 487-511, 2018.
European Communication pursuant to Article 94(3) EPC, corresponding to EP Application No. 18 922 800.0, dated Dec. 6, 2023.

* cited by examiner

DYNAMIC MANAGEMENT OF APPLICATION SERVERS ON NETWORK EDGE COMPUTING DEVICE

FIELD

Embodiments of the present disclosure generally relate to the field of communications, and in particular, to a method, apparatus, device and computer readable storage media for management of application servers on network edge computing device and a method, apparatus, device and computer readable storage media for performing management operation related to application servers on network edge computing device.

BACKGROUND

The digital content market is constantly increasing recently. With the development of the high-speed mobile network and increasing number of smart devices, the global digital content market is expected to keep remarkably expanding in future. Augmented Reality (AR)/Virtual Reality (VR) technologies could further speed up developing of the digital content market.

The AR/VR technologies were already considered to support many attractive use cases that take fully advantage of fifth generation (5G) technologies. Thus, the 5G network is expected to allow real time large data transmission for VR/AR experiences on many applications such as gaming, telepresence, displaying, reconstruction, etc. For example, the 5G technologies will enable interaction with the virtual content even in an outdoor AR online game. Nowadays, there are many devices like the Microsoft HoloLens, which could provide AR contents for a single user within a confined area. Thus, these devices would be allowed to provide real time services in a social manner. There will be endless opportunities with the advent of 5G, Internet of Things (IoT), and there will be various cases like stadium content upload, automotive video streaming, e-health, etc. In addition, there are also many other cases requiring a low latency in the 5G system, such as drone based package delivery, drone based surveillance, discrete automation with motion control, remote driving and the like. These cases will significantly contribute to public safety, scientific research, industrial production and people's daily life.

The latency is critical to user experiences regarding those applications, like AR/VR interactive applications. Sometimes, even a small delay could bring a bad experience to the user. For example, in an online gaming, the virtual content is related to the real world, and when multiple players are present in an online game, the Motion-to-photon (MTP) latency is the time between an action (a head movement) and reaction (the display is updated based on the movement). Therefore, when a user moves his/her head, the brain expects an instantaneous visual and aural update, and a minute delaying could be problematic. Usually, MTP latency below 20 ms is acceptable for many VR user experiences, but studies have further shown that MTP latency below 15 ms will make the delay imperceptible to nearly all users. However, network topologies affect the latency greatly and we need a solution ensuring the satisfaction of the strict latency requirements.

SUMMARY

In general, example embodiments of the present disclosure provide a method, apparatus, device and computer readable storage media for management of application servers and a method, apparatus, device and computer readable storage media for performing management operation related to application servers.

In a first aspect, there is provided a method for management of application servers on network edge computing device. At a management function module, a calling function deployment command is transmitted to a network edge computing device to deploy a calling function instance on the network edge computing device. The calling function instance is configured to connect with application servers for respective applications and handle communications between terminal devices and the application server. A management command for application servers on the network edge computing device is further transmitted to at least one of the network edge computing device and the calling function instances, in response to a network condition meeting one of predetermined management policies.

In a second aspect, there is provided a method for performing management operations related to application servers on network edge computing device. At a network edge computing device, a calling function instance is deployed on the network edge computing device in response to receipt of a calling function deployment command from a management function module, the calling function instance being configured to connect with application servers for respective applications and handle communications between terminal devices and the application servers. A management operation related to application servers on the network edge computing device is performed by the network edge computing device or the calling function instance, in response to receipt of a management command for the application servers on the network edge computing device from the management function module.

In a third aspect, there is provided an apparatus for managing application servers on network edge computing device. The method comprises a policy module, an information storage module, a communication module and an execution logic module. The policy module is configured to make management policies for respective applications and store the management policies. The storage module is configured to store information on at least one of a network edge computing device, a calling function instance created on the network edge computing device, and application servers on the network edge computing device. The communication module is configured to provide application interfaces to at least one of the network edge computing device, the calling function module, and application servers on the network edge computing device. The execution logic module is configured to communicate with the policy module, the storage module and the communication module, and manage life cycles for application servers on the network edge computing device by performing actions according to a method according to the first aspect.

In a fourth aspect, there is provided an apparatus for performing management operations related to application servers on network edge computing device. The apparatus comprises a communication module and a command execution module. The communication module is configured to provide an application interface to a management function module. The command execution module is configured to communicate with the communication module, and perform management operations related to application servers on the network edge computing device by performing actions according to a method according to the second aspect.

In a fifth aspect, there is provided a device comprising: at least one processor and at least one memory including computer program code. The at least one memory and the computer program code are configured to, with the at least one processor, cause the device to perform actions according to the first aspect.

In a sixth aspect, there is provided a device comprising: at least one processor and at least one memory including computer program code. The at least one memory and the computer program code are configured to, with the at least one processor, cause the device to perform actions according to the second aspect.

In a seventh aspect, there is provided a computer readable storage medium that stores a computer program thereon. The computer program, when executed by a processor, causes the processor to carry out the method according to the first aspect.

In an eighth aspect, there is provided a computer readable storage medium that stores a computer program thereon. The computer program, when executed by a processor, causes the processor to carry out the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
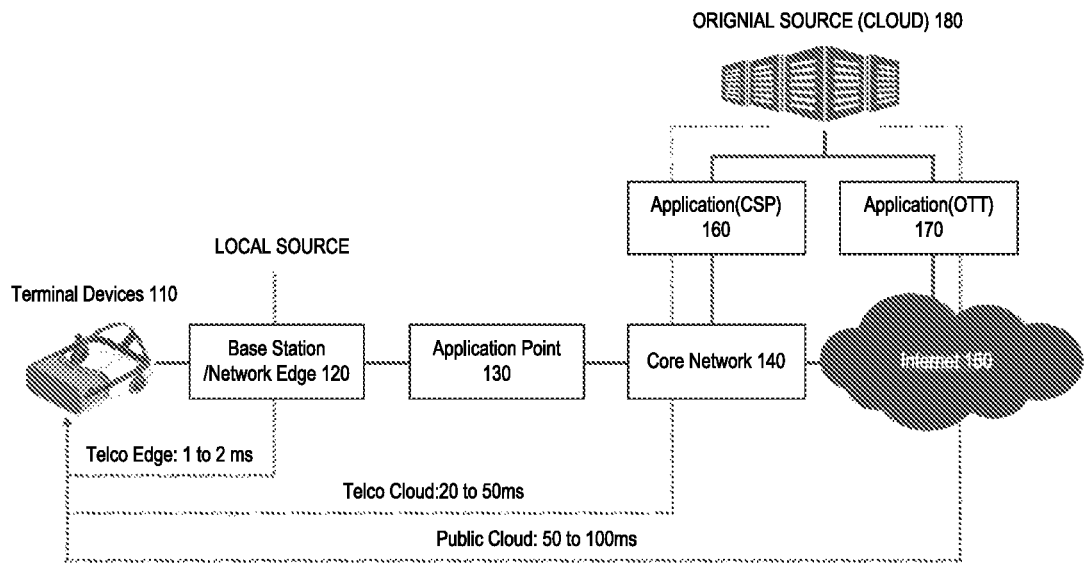
FIG. 1 schematically illustrates example influences of network topologies on content delivery latencies.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "communication network" refers to a network that follows any suitable communication standards or protocols such as long term evolution (LTE), LTE-Advanced (LTE-A) and 5G New Radio (NR), and employs any suitable communication technologies, including, for example, Multiple-Input Multiple-Output (MIMO), OFDM, time division multiplexing (TDM), frequency division multiplexing (FDM), code division multiplexing (CDM), Bluetooth, ZigBee, machine type communication (MTC), enhanced Mobile Broadband (eMBB), massive Machine Type of Communication (mMTC) and ultra Reliable & Low Latency Communication (uRLLC) technologies. For the purpose of discussion, in some embodiments, the LTE network, the LTE-A network, the 5G NR network or any combination thereof is taken as an example of the communication network.

As used herein, the term "network device" refers to any suitable device at a network side of a communication network. The network device may include any suitable device in an access network of the communication network, for example, including a base station (BS), a relay, an access point (AP), a node B (NodeB or NB), an evolved NodeB (eNodeB or eNB), a gigabit NodeB (gNB), a Remote Radio Module (RRU), a radio header (RH), a remote radio head (RRH), a low power node such as a femto, a pico, and the like. For the purpose of discussion, in some embodiments, the eNB is taken as an example of the network device.

The network device may also include any suitable device in a core network, for example, including multi-standard radio (MSR) radio equipment such as MSR BSs, network controllers such as radio network controllers (RNCs) or base station controllers (BSCs), Multi-cell/multicast Coordination Entities (MCEs), Mobile Switching Centers (MSCs) and MMEs, Operation and Management (O&M) nodes, Operation Support System (OSS) nodes, Self-Organization Network (SON) nodes, positioning nodes, such as Enhanced Serving Mobile Location Centers (E-SMLCs), and/or Mobile Data Terminals (MDTs).

As used herein, the term "terminal device" refers to a device capable of, configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some embodiments, the terminal device may be configured to transmit and/or receive information without direct human interaction. For example, the terminal device may transmit information to the network device on predetermined schedules, when triggered by an internal or external event, or in response to requests from the network side.

Examples of the terminal device include, but are not limited to, user equipment (UE) such as smart phones, wireless-enabled tablet computers, laptop-embedded equipment (LEE), laptop-mounted equipment (LME), and/or wireless customer-premises equipment (CPE). For the purpose of discussion, in the following, some embodiments will be described with reference to UEs as examples of the terminal devices, and the terms "terminal device" and "user equipment" (UE) may be used interchangeably in the context of the present disclosure.

As used herein, the term "cell" refers to an area covered by radio signals transmitted by a network device. The terminal device within the cell may be served by the network device and access the communication network via the network device.

As used herein, the term "circuitry" may refer to one or more or all of the following:
  (a) hardware-only circuit implementations (such as implementations in only analog and/or digital circuitry); and
  (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and
  (c) hardware circuit(s) and or processor(s), such as a microprocessor(s) or a portion of a microprocessor(s), that requires software (e.g., finnware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As mentioned in hereinbefore, the latency is critical to user experiences regarding those applications, like AR/VR interactive applications; however, it is hard to achieve the latency requirement. The inventor notices that there are many factors affecting the latency, and amongst others, the network topology is one of key factors. For illustrative purposes, FIG. 1 shows three different network topologies and their associated latencies. Specifically, FIG. 1 illustrates terminal devices 110, base station/network edge device 120, application point 130, the core network 140, Internet 150, Application (CSP) 160, Application ("Over The Top (OTT)") 170 and three network topologies for providing service to terminal devices. In network topology 1, the latency sensitive application is located in the base station/network edge device 120 and the latency is about 1 ms to 2 ms. In network topology 2, the application is located in the telecommunication cloud and the latency increases up to 20 to 50 ms. In the third topology 3, the application is located in the public cloud and the latency reaches 50 ms to 100 ms. Thus, it can be seen that imperceptible latencies for AR/VR interactive experience can only be achievable when application is hosted at the edge of the network.

As a common system for all IP-based rich communication services (RCS), the IMS (IP Multimedia Subsystem) contributes to multimedia content delivery across packet networks and provides a unified service management and session control mechanism for applications. The IMS maintains a set of application servers to offer a set of services to the customer and provides wide and RCS experiences offered by the service providers. Examples of communication services includes but not limited to high-definition (HD) (Voice over Long Term Evolution (VoLTE)), Wi-Fi calling, enriched messaging, enriched calling with pre-call info, video calling, HD video conferencing and web communication (e.g. WebRTC, etc. . . . ).

The IMS has the capability to provide real time large data transmission service like VR and AR. Moreover, the Session Border Controller (SBC)/IMS could embed voice, video calls and RCS messages to/from any phone within a VR/AR environment connecting the virtual reality to the real world, rather than typical isolated communication experiences available through the existing VR/AR platforms.

In addition, it was brought a concept that uses mobile-edge computing to provide information technology (IT) and cloud-computing capabilities within the Radio Access Network (RAN) in close proximity to mobile subscribers. The mobile-edge computing allows content, services and applications to be accelerated, increasing responsiveness from the edge. Thus, the inventor believes that the RAN edge cloud be used to offer a service environment with ultra-low latency and high-bandwidth as well as direct access to real-time radio network information.

Considering IMS's capability of providing unified service experience, it seems an advisable solution to deploy the IMS at the edge cloud of RAN to achieve ultra-low latency for interactive application experience. However, if the IMS is deployed at the edge cloud, the data quantity will be remarkably large and the architecture will be rather complicated, which would lead to huge unnecessary bandwidth and large computing resource usage. Moreover, the service management will also be quite complicated. All these would go away from the original aim to implement edge computing, like reducing latency, ensuring highly efficient network operation and service delivery, etc.

Thus, there is a need for a solution of supporting latency sensitive APPs in a simple way. On one hand, it is expected that the architecture shall be simple and the data base shall be small; on the other hand, it will be also desirable if the application server (AS) deployment could support the real-time application service but not occupy too much edge resources.

Embodiments of the present disclosure provide a new solution for dynamic management of application servers. The basic idea is to exploit a management function module at network side and predetermined management policies to dynamically manage a calling function of the IMS and application servers on an edge cloud for latency sensitive applications or other applications requiring such management. In this way, it could enable an intelligent decision whether appropriate IMS network elements and AS should be deployed to the edge cloud due to application requirements, thereby utilizing links/resources efficiently.

In various embodiments of the present disclosure, the management function module transmits to a network edge computing device a calling function deployment command. The network edge computing device deploys, in response to the calling function deployment command, a calling function instance on the network edge computing device, the calling function instance being configured to connect with application servers for respective applications and handle communications between terminal devices and the application servers. In response to a network condition meeting one of predetermined management policies, the management function module may transmit, to at least one of the network edge computing device or the calling function instances, a management command for application servers on the network edge computing device. Upon receipt of the management command, the network edge computing device or the calling function instance performs a management operation related to application servers on the edge device such as adding, deleting or modifying AS (for example, modifying one or more parameters of AS) and/or create, delete, or modify a calling function instance (for example, modifying one or more parameters of the RCS-CF). In this way, the application servers can be managed dynamically for certain applications and only the calling function of the IMS is required to be installed on the network edge computing device. Thus, it could meet an ultra-low latency requirement with acceptable edge resources.

In embodiments of the present disclosure, the management function module will be described as a part of the IMS, which can be called as RCS-MF and the RCS-MF will be taken as an example to describe the management function module. The network edge computing device could be implemented as or within the edge cloud and the edge cloud will be taken as an example to describe network edge computing device. However, it shall be appreciated that the present disclosure is not limited thereto, the management function module could also be implemented as other similar module like the RCS-MF and the network edge computing device could be implemented as other edge computing device like the edge cloud.

It shall be also appreciated that the present disclosure is proposed mainly for latency sensitive applications such as AR/VR applications, drone based package delivery, drone based surveillance, discrete automation with motion control, remote driving and the like and AR/VR applications might be taken as an example of the latency sensitive applications. The present disclosure is not limited thereto and it could also be applicable to other applications requiring improving performance by dynamic management. For example, if the traffic is too high for a particular type of application, it could use the solution as proposed herein to dynamically manage its application service resources as well.

Figure 2A:
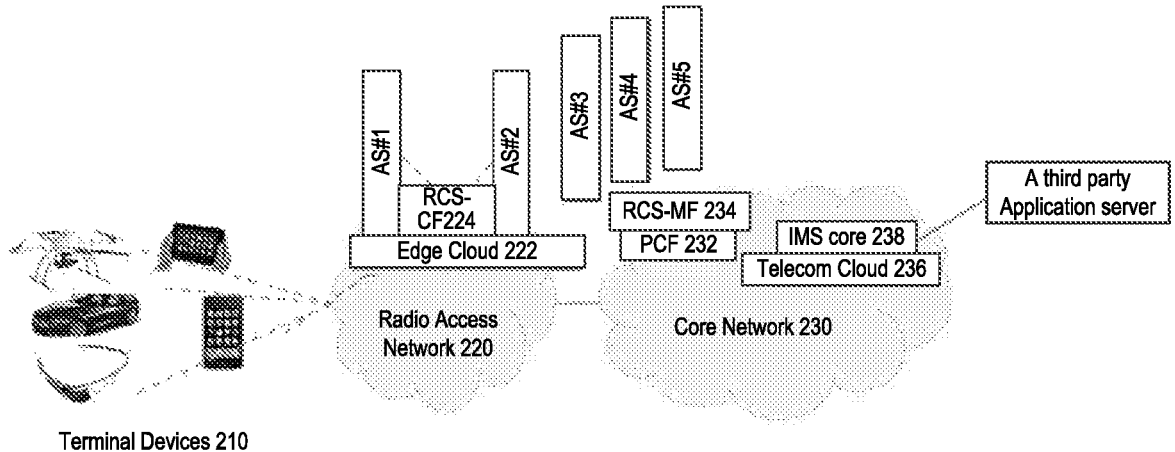
FIG. 2A schematically illustrates example network architecture for application server management according to an embodiment of the present disclosure.

FIG. 2A schematically illustrates example network architecture for the application server management according to an embodiment of the present disclosure. In the illustrated architecture, terminal devices 210 are connected to a radio access network (RAN) 220 (for example 5G RAN) having a network edge computing device such as an edge cloud 222. The edge cloud 222 could create, delete, or modify a calling function instance such as RCS-CF 224 thereon and add, delete or modify application servers like AS #1 to AS #5 in response to a management command from a management function module such as RCS-MF 234. AS #1 to AS #5 could be application servers for VA/AR applications, industry automation, tele-operation, remote control, remote driving, etc.

In the illustrated architecture, the RCS-MF 234 is located on another communication system such as core network 230. On the core network 230, the RCS-MF 234 is deployed on the Policy Control function (PCF) module 232 and an IMS core 238 is deployed on a telecommunication cloud 236 and could be a third party application server. The RCS-MF 234 could command the edge cloud 222 and the RCS-CF 224 on the edge cloud 222 to dynamically manage application servers AS #1 to AS #5 for respectively applications. It shall be appreciated that although the RCS-MF is described as to be deployed on the PCF in the core network 230, the present disclosure is not limited thereto. In some embodiments of the present disclosure, the RCS-MF could also be located on other entities than the PCF or even not in the core network 230.

Figure 2B:
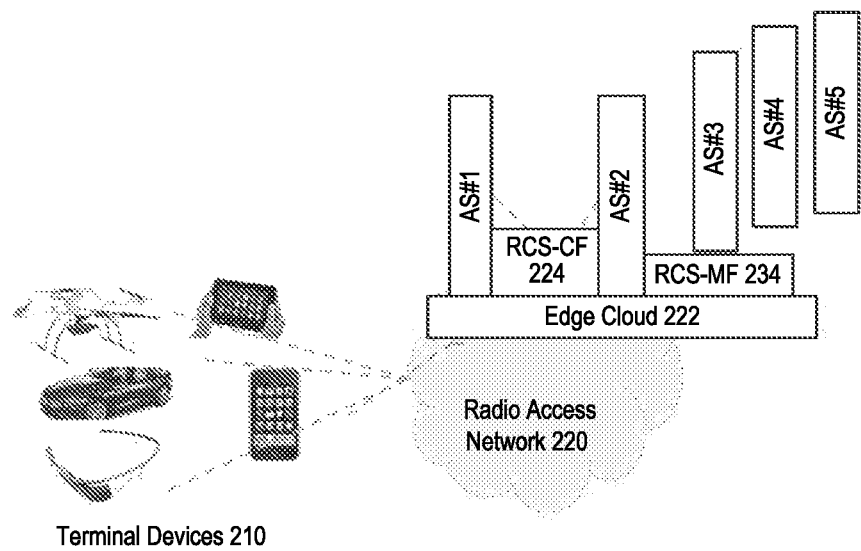
FIG. 2B schematically illustrates another example network architecture for application server management according to another embodiment of the present disclosure.

FIG. 2B schematically illustrates another example network architecture for the application server management according to an embodiment of the present disclosure. The illustrated architecture is similar to the architecture illustrated in FIG. 2A but the difference lies in that the RCS-MF 234 is located on the edge cloud of the RAN 220 (5G RAN) instead of the core network 210. In the architecture illustrated in FIG. 2B, the RCS-MF 234 could only manage the RCS-CF and AS on the edge cloud 222, while in the architecture illustrated in FIG. 2A, the RCS-234 could further manage RCS-CF on other edge clouds than edge cloud 222.

It shall be appreciated that the example architecture illustrated in FIG. 2A or 2B is only given for illustrative purposes and the present disclosure is not limited thereto. In practical applications, it could also exploit different architecture. For example, it is possible to use a mixing architecture for a plurality of edge clouds, wherein some RCS-MFs use the architecture as illustrated in FIG. 2A and other RCS-MFs use the architecture as illustrated in FIG. 2B For another example, for the same one edge cloud, some types of application servers could be managed by RCS-MF on the edge cloud, and other types of application servers can be managed by RCS-MF on the core network. In addition, for one edge cloud, it is also possible to deploy the RCS-MF on both edge cloud and the core network to provide a redundant backup and thus, when one of the two RCS-MFs fails, the other one could take over the management.

It shall be appreciated that although the RCS-MF could be located on either the edge cloud or the core network, the RCS-MF could have a similar structure. Hereinafter, reference will be made to FIG. 3 to describe an example implementation of an RCS-MF module according to some embodiments of the present disclosure.

Figure 3:
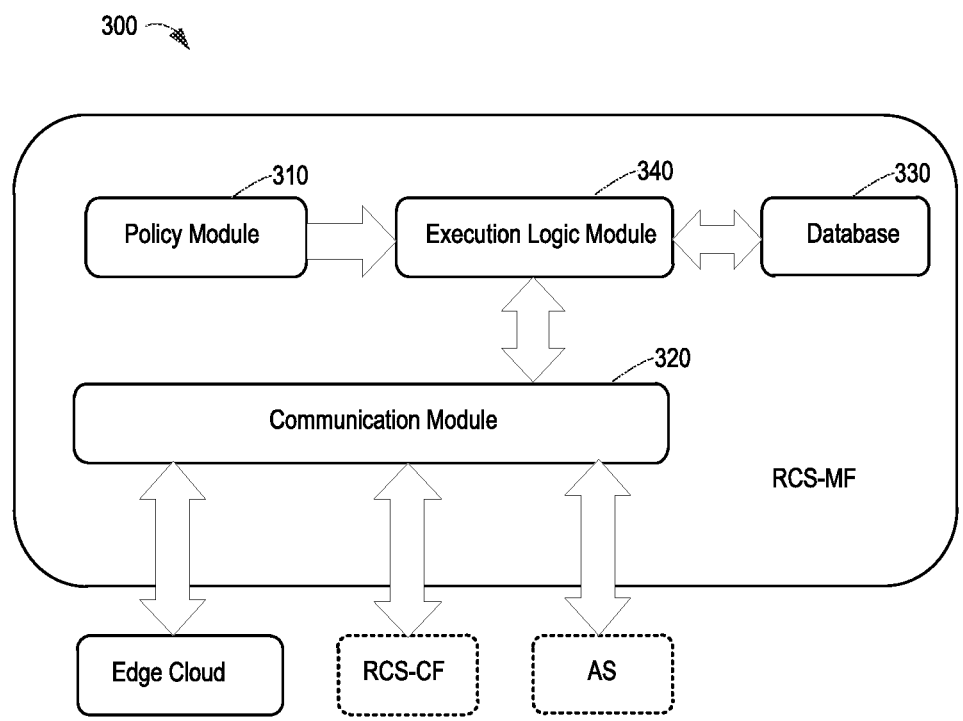
FIG. 3 schematically illustrates an example implementation of a Rich Communication Service—Management Function (RCS-MF) module according to some embodiments of the present disclosure.

FIG. 3 schematically illustrates an example implementation of an RCS-MF module according to some embodiments of the present disclosure. As illustrated in FIG. 3, the RCS-MF module 300 may include four modules: a policy module 310, a communication module 320, a database module 330 and an execution logic module 320.

The policy module 310 is configured to make management policies. To manage the application servers, the RCS-MF sets up criteria and rules of ultra-low latency for use cases and AS resources. For example, the policies could be based on provisioning or input from other network elements, such as Unified Data Management (UDM), User plane Function (UPF), RCS-CF, etc. The management decisions made by RCS-MF could be based on the policies. The policy module 310 could further perform network condition monitoring and latency estimation for applications or various types of application, and determine whether the latency meeting one of the predetermined management policies, for example determine whether a RCS Calling Function (RCS-CF) exceeds the criteria and threshold with a policy-guided function (from RCS-MF) so that RCS-MF could determine operations how to manage the applications servers for respective applications. It shall be noticed that the network condition monitoring, the latency estimating and the determining could also be performed by any other suitable module in the RCS-MF.

The database module 320 stores information on the edge cloud, the RCS-CF and the AS. In a network architecture in which the RCS-MF is installed on an edge cloud, the database module 320 stores only information of this edge cloud and corresponding RCS-CF and AS instances thereon. If the RCS-MF is installed on the PCF in the core network, the RCS-MF may have an access to multiple edge clouds under control of this PCF, and the database module 320 may store the information of these edge clouds as well as the RCS-CF and AS instances.

The execution logic module 340 interacts with the policy module 310, the database module 330 and the communication module 320 and is responsible for life cycle management for RCS-CF and AS. In some embodiments of the present disclosure, the execution logic module 340 could command the edge cloud to add, delete or scale RCS-CF, or add, delete or scale AS. In a simple implementation, the RCS-CF could be deployed during initialization of the RCS-MF and exists for the whole life cycle of the RCS-MF. Alternatively, the RCS-CF could also be added, deleted, scaled when a predetermined deployment condition is detected. For example, the predetermined deployment condition can be input in advance and the PCF could detect the network condition. The execution logic module 340 could determine whether any predetermined deployment condition is met based on the detected network condition, and command the edge cloud to deploy an RCS-CF instance if the predetermined deployment condition is met. The AS's life cycle could be dynamically controlled by the execution logic module 340. The AS instances could be added, deleted, scaled based on the predetermined management policies and the network condition. The execution logic module 340 could also be responsible for updating information stored in the database module.

Figure 4:
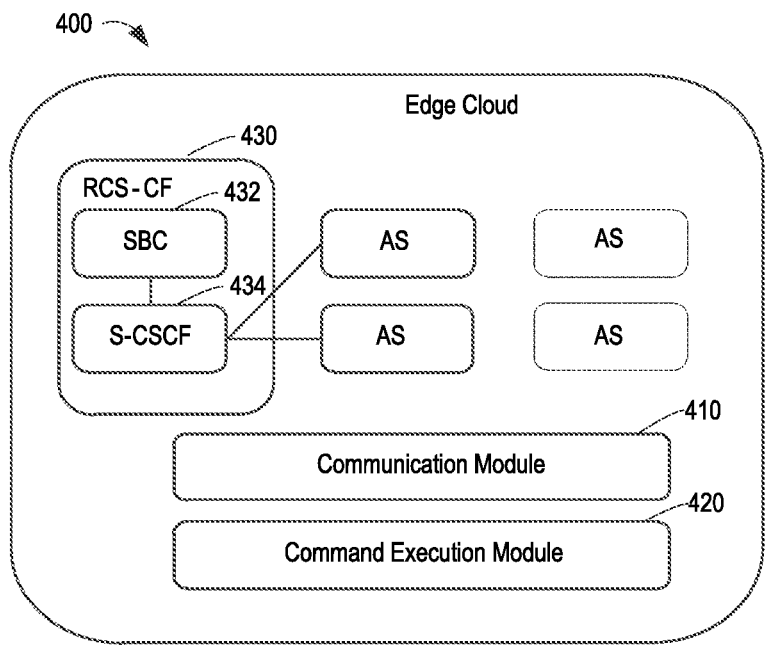
FIG. 4 schematically illustrates an example implementation of an network edge computing device according to some embodiments of the present disclosure.

FIG. 4 schematically illustrates an example implementation of a network edge cloud device according to some embodiments of the present disclosure. As illustrated in FIG. 4, the network edge cloud device could be edge cloud 400 including a communication module 410 and a command execution module 420.

The communication module 410 is configured to enable the communication between the edge cloud 400 and the RCS-MF 300. For different network architecture, the communication module 410 may have somewhat different implementations. In some embodiments of the present disclosure, the RCS-MF is installed on the edge cloud and thus the communication module is configured to enable the message to be transferred within the application layer. In other embodiments of the present disclosure, the RCS-MF is installed on the PCF in the core network, and in such architecture, the communication module is an independent module and provides APIs of the RCS-MF to support messages from/to the RCS-MF.

The command execution module 420 is configured to perform, upon receipt of a management command from the RCS-MF, management operations on instances, for example allocating or de-allocating resources of RCS-CF or AS instances, modifying RCS-CF, or AS. The command execution module 420 cloud initiate these instances upon receiving a deployment command from the RCS-MF.

The RCS-CF instance 430 could be created by the command execution module 420 during the initialization of the RCS-MF or upon detection of a predetermine deployment condition. The RCS-CF includes IMS network elements that are capable of performing call functionalities and connecting to AS. In some embodiments of the present disclosure, the RCS-CF instance 430 includes a Session Border Controller (SBC) 432 and a Serving Call Session Control Function (S-CSCF) 434.

The SBC 432 is located between the 5G RAN and the IMS network and functions as an access point for the terminal device to access the IMS. The SBC could solve problems that make the IMS a powerful element, including problems concerning, for example, multiple access networks (e.g. IPv4 and IPv6, Session Initiation Protocol (SIP) normalization, Virtual Private Networks (VPNs)), security issues (Disk Operating System (DOS) attacks, topology hiding), legislative issues (emergency calls, legal intercept, interworking), media related problems (Quality of Service (QoS), transcoding, media security) an etc. Moreover, the SBC also plays the role of Proxy-Call Session Control Function (P-CSCF).

The S-CSCF 434 is responsible for the signaling control during session. Both AS instances on the edge cloud and AS instances on other network devices are connected to the S-CSCF 434 so that a session could be established between a terminal device and a suitable AS instance. The S-CSCF handles SIP registrations and decides to which application server(s) the SIP message will be forwarded so as to provide services to the terminal devices. Thus, the SBC gives service providers an economical and reliable means to secure and control media and signaling streams that cross the edges of an IMS network. The SBC may be located at the edge of access networks to secure any type of IP access, and deliver IMS services. The SBC may be also arranged at the edge of peer networks to support roaming, IMS interconnection or corporate SIP trunking scenarios.

In addition, the RCS-CF 430 may be configured with the predetermined polices. In such a case, the RCS-CF 430 may perform network condition monitoring and latency estimating for applications or various types of applications, determine whether the latency meeting one of the predetermined management policies and send a notification to the RCS-MF based on the polices.

Thus, deploying SBC and S-CSCF in RCS-CF could fulfil the goal that RCS-CF is able to handle calls and connect to AS. The SBC and S-CSCF in RCS-CF 430 could have a substantially same structure with the existing RCS-CF; however, in some embodiments of the present disclosure, it could be further provisioned with some predetermined management rules, which will be described hereinafter.

Figure 5:
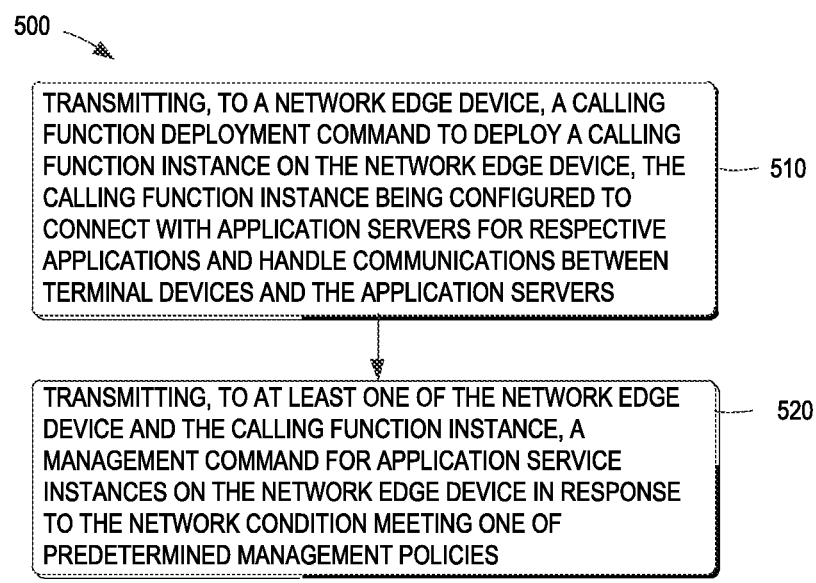
FIG. 5 schematically illustrates an example flow chart of a method of managing application servers on network edge computing device according to some embodiments of the present disclosure.

FIG. 5 illustrates an example flow chart of a method of managing application servers on network edge computing device according to some embodiments of the present disclosure. The method 500 could be implemented in the RCS-MF module 234, 300 which may be located on either edge cloud 222 in the radio access network like 5G RAN 220 or the PCF 232 in the core network 230. For the purpose of discussion, the method 500 will be described with reference to FIG. 3.

At block 510, the management function module like RCS-MF transmits a calling function deployment command to a network edge computing device such the edge cloud, to deploy a calling function instance on the network edge computing device, the calling function instance being configured to connect with application servers for respective applications and handle communications between terminal devices and the application servers.

In some embodiments of the present disclosure, during initialization of the RCS-MF 300, the execution logic module 340 decides to create a RCS-CF. The execution logic module 340 accesses the database module 330 to get the address information of the edge cloud and sends a calling function deployment to the edge cloud through the communication module 320 to create an RCS-CF instance.

The RCS-CF includes IMS network elements that are capable of performing call functionalities and connecting to AS and deploying an SBC and an S-CSCF in RCS-CF fulfils our goal that RCS-CF is able to handle calls and connect to AS.

In some embodiments of the present disclosure, the RCS-CF could be provisioned with some predetermined management rules to perform network condition monitoring operations based on predetermined management rules. In such a case, the RCS-MF may first transmit a call function creation command to the network edge computing device to create the calling function instance on the network edge computing device, and then transmit a call function configuration command containing the predetermined management policies to the created calling function instance to configure the created call function instance with the predetermined management policies.

The RCS-MF 300, particularly the execution logic module 340, is responsible to send a configuration command through the communication module 420 to the RCS-CF. The configuration command may contain the management policies from the RCS-MF. The configuration command can be initiated either upon the initialization of the RCS-MF or upon policy update. The execution logic module 340 could decide when to initiate the request. The management policies are made by the policy module 301 and it could define aspects of decisions that should be made by the RCS-CF with an aim at dynamically utilizing the AS resources to achieve maximum utilization of edge resources. Both RCS-MF and RCS-CF are aware of the mapping relationship.

For illustrative purposes, Table 1 shows an example of management policies towards a specific RCS-CF and decisions of the RCS-CF in certain scenarios according to some embodiments of the present disclosure. In Table 1, parameter "AppId" denotes an identity that represents an application type, which usually refers to an application that requires ultra-low latency; parameter "TrThresH" denotes a high traffic rate threshold, above which the RCS-CF needs to handle the condition within the edge cloud; parameter "TrThresL" denotes a low traffic rate threshold, below which the traffic should be routed to the core network; parameter "LaThres" denotes a latency threshold for a specific application; and parameter "TrTimer" denotes a timer value.

TABLE 1

An example of management policies towards a specific RCS-CF and decisions of the RCS-CF in certain scenarios

| RCS-MF Policy Description | RCS-CF Decision |
| --- | --- |
| AppId TrThresH | The initial state is that RCS-CF handles this type of request through core network. Once the traffic rate of request reaches TrThresH for , RCS-CF send request to RCS-MF for allocating application server on edge cloud. |
| AppId TrThresL TrTimer | The initial state is that RCS-CF handles this type of request within the AS allocated on the edge cloud. Once the traffic rates drop below TrThresL and after TrTimer, the traffic does not reach TrThresL again. RCS-CF send notify to RCS-MF for de-allocating this application server. |
| AppId la Thres | The initial state is that RCS-CF handles this type of request through core network. Once RCS-CF detects that the latency of this application exceeds latThres, which means, the latency already impacted user experience. RCS-CF send request to RCS-MF for allocating application server on edge cloud. |

In Table 1, it respectively specifies conditions that the RCS-CF shall request the RCS-MF to add a new AS, or delete an existing AS, wherein the first and third row are policies for sending notification of adding new AS and the second row is a policy for sending a notification of deleting AS.

It shall be appreciated that these policies illustrated in Table 1 are only given for illustrative purposes and the present disclosure is not limited thereto. In some embodiments, it is also possible to contain different policies, contains more policies, or less policies. For example, it may further contain one or more policies for RCF instance adding, deleting, modifying, AS modifying, etc.

Figure 6:
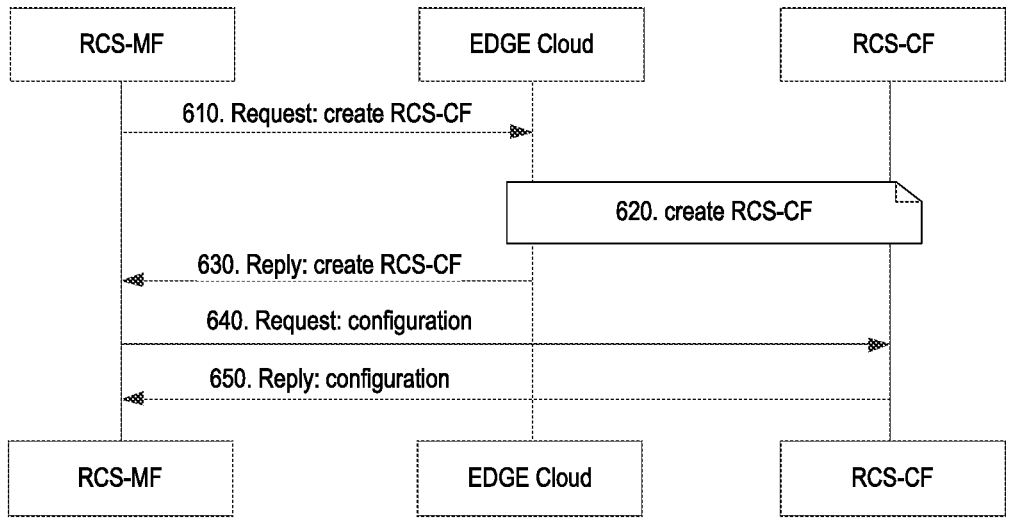
FIG. 6 schematically illustrates an example signaling flow chart of Rich Communication Service—Calling Function (RCS-CF) deployment according to some embodiments of the present disclosure.

For illustrative purposes, FIG. 6 illustrates an example signaling flow chart of RCS-CF deployment according to some embodiments of the present disclosure. As illustrated in FIG. 6, first at step 610, the RCS-MF sends a request/command to the edge cloud to create an RCS-CF. In response to the received request/command, the edge cloud allocates resources for RCS-CF and initializes an RCS-CF instance in step 620. After finishing the creating of the RCS-CF, in step 630, the edge cloud sends back a reply message to inform the RCS-MF that RCS-CF is successfully allocated. This reply message includes information on the new created RCS-CF. The RCS-MF obtains the RCS-CF's information from the reply message and updates the database module accordingly. Then, in step 640, the RCS-MF may further send a configuration request/command to the RCS-CF, and the request/command contains predetermined management policies used for RCS-CF provisioning. After RCS-CF's provisioning with the predetermine management policies, the RCS-CF sends in step 650 a configuration reply to notify the RCS-MF that the RCS-CF was provisioned as required.

In those embodiments in which the calling function instance is configured with the predetermined management policies, the RCS-MF may further receive a network condition notification from the calling function instance on the edge cloud. The network condition notification may include information indicating the network condition meeting the one of the predetermined management policies. The RCS-MF may transmit a management command comprising transmitting the management command in response to receiving of the network condition notification. Thus, in the present disclosure, RCS-CF could monitor the network condition based on these policies but the RCS-MF still makes the decision whether to perform resource management on the edge cloud. In addition, the PCF could also obtain the network condition and thus the network condition monitoring could also be performed by the PCF.

Reference is made back to FIG. 5, at block 520, the management function module transmits, to at least one of the network edge computing device and the calling function instances, a management command for application servers on the network edge computing device. in response to a network condition meeting one of predetermined management policies. In some embodiments of the present disclosure, the management command may include an application server allocation command to add a new application server, an application server de-allocation command to delete an application server; an application server modification command to modify an application server; a calling function creation command to create a calling function instance; a calling function deleting command to delete a calling function instance; a calling function modification command to modify a calling function instance; an application server connection command to connect an application server to a calling function instance; a calling function configuration command containing management policies to configure a calling function instance with the updated management policies.

As mentioned before, the policy module 310 of the RCS-MF 300 makes the management policies according to its local provisioning and input from other NEs like UDM, UPF, RCS-CF, etc. In some embodiments of the present disclosure, the PCF could monitor the network condition and the RCS-MF's execution logic module 340 could determine, based on the management policies from the policy module 310, whether there is ultra-low latency service requesting to this AS or the traffic is too high from the RCS-CF to this AS to meet the latency requirement. If so, the execution logic module 340 sends a command through the communication module 320 to the edge cloud to allocate AS resources and create a new AS. For example, the RAN (for example, 5G RAN) where the edge cloud is located may cover the area of a mall which opens from 9:00 AM to 10:00 PM, and serves a very large crowd during that time. The mall provides AR shopping experience and thus a large number of AR service requests are expected during the period from 9:00 AM to 10:00 PM. In this case, a management command may be sent to the edge cloud to allocate AR AS under control of the RCS-MF to meet the service requirements.

In some embodiments of the present disclosure, the RCS-CF could be provisioned with some predetermined management rules, for example those given in Table 1 and the RCS-CF may monitor the network condition based on the provided policies, and transmit a network condition notification to the management function module, when the network condition meets one of the predetermined management policies. The execution logic module 340 could decide whether to transmit a management command to the edge cloud to dynamically manage the RCF-CF or AS, When the policies or network condition changes, the RCS-MF may also send another command to add, modify or de-allocate AS resources on edge cloud. For example, if there is a sport event which uploads the real-time VR streams, the RCS-MF could command the edge cloud to allocate the VR AS before the event starts and de-allocate VR AS after the event ends. Thus, while the sport event ends, the related VR AS will be terminated.

Figure 7:
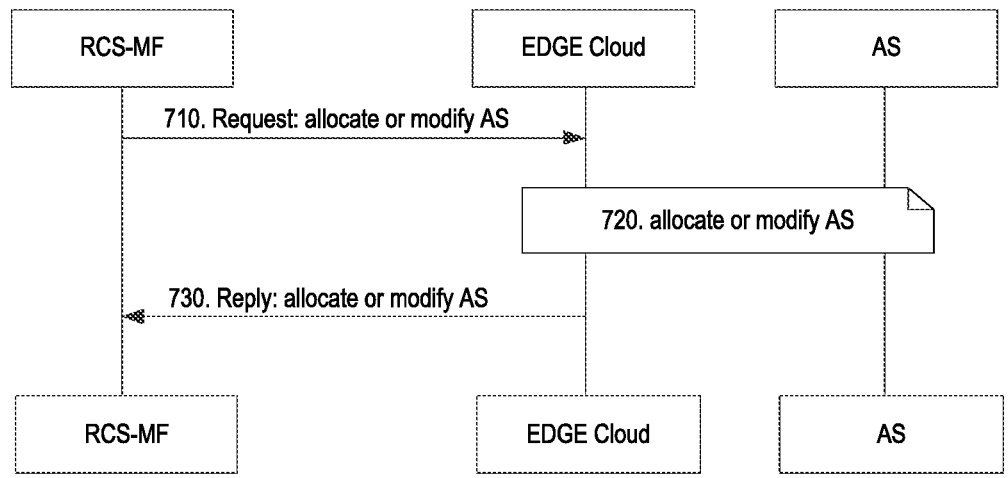
FIG. 7 schematically illustrates an example signaling flow chart of application server (AS) allocation or modification according to some embodiments of the present disclosure.

For illustrative purposes, FIG. 7 illustrates an example signaling flow chart of AS allocation or modification according to some embodiments of the present disclosure. As illustrated in FIG. 7, first in step 710, the RCS-MF sends an AS allocation or modification request/command to inform the edge cloud that an AS needs to be created or updated. Upon receipt of the request/command, the edge cloud creates or updates an AS. Thereafter, the edge cloud sends a reply to this AS allocation or modification request/command. This reply message includes newly created or updated AS information. The RCS-MF will update the database module with the information on the AS.

Figure 8:
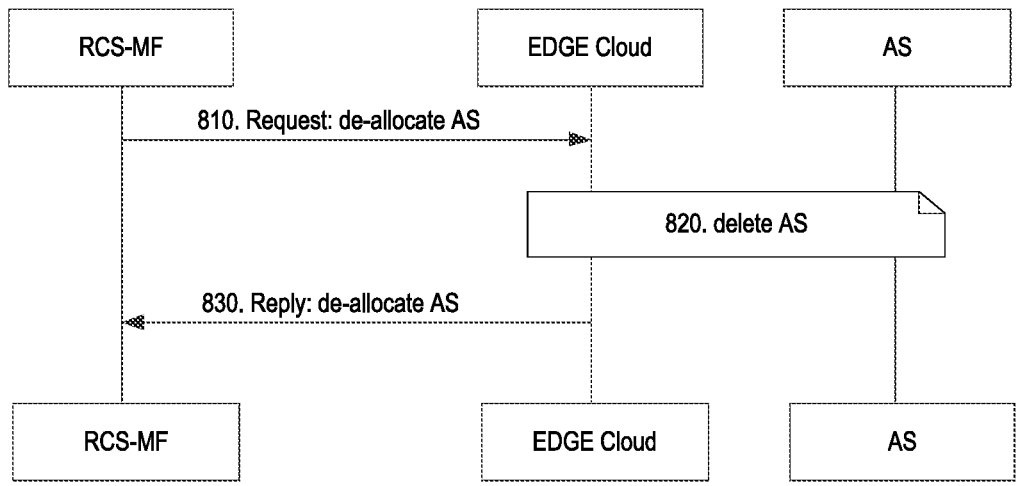
FIG. 8 schematically illustrates an example signaling flow chart of AS de-allocation according to some embodiments of the present disclosure.

FIG. 8 further illustrates an example signaling flow chart of AS de-allocation according to some embodiments of the present disclosure. As illustrated in FIG. 8, first in step 810, the RCS-MF sends an AS de-allocation request/command to inform the edge cloud that an AS needs to be deleted. Upon receipt of the request/command, the edge cloud de-allocates an AS. Thereafter, the edge cloud sends a reply to this AS de-allocation request/command. This reply can be just an ACK and does not include any AS information. The RCS-MF will delete the information of this AS from the database module after receiving this reply.

Figure 9:
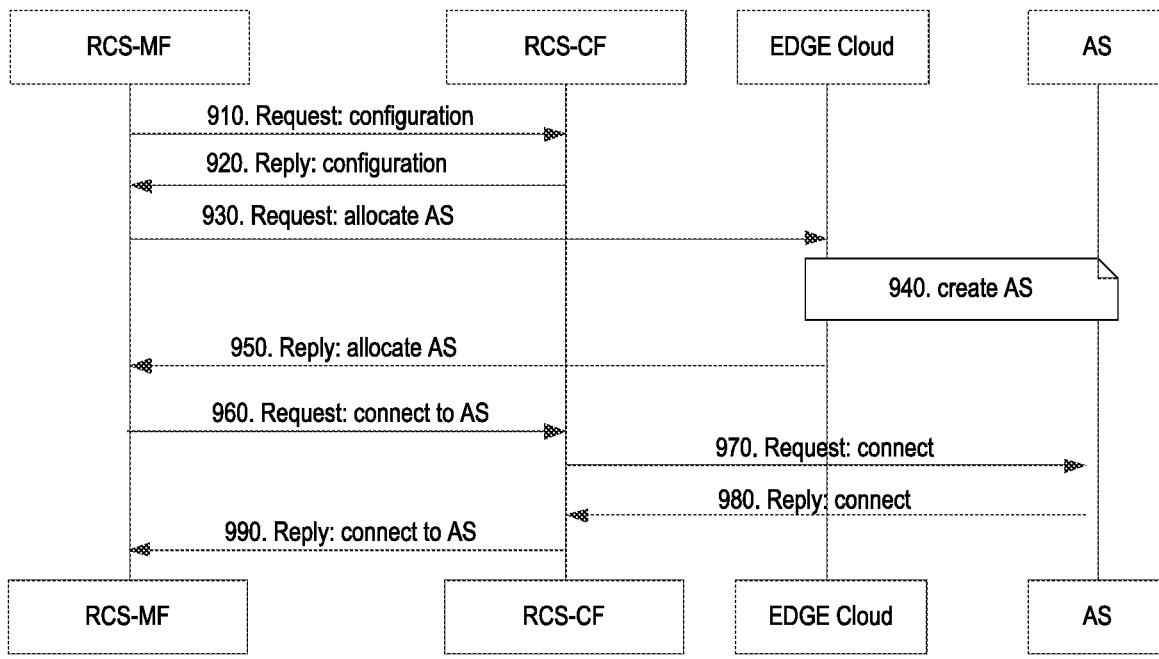
FIG. 9 schematically illustrates an example signaling flow chart of operations from RCS-CF configuration and AS connection according to some embodiments of the present disclosure.

FIG. 9 illustrates an example signaling flow chart of operations from RCS-CF configuration and AS connection according to some embodiments of the present disclosure. As illustrated in FIG. 9, first in step 910, the RCS-MF sends a request/command to provision RCS-CF and then in step 920, the RCS-CF send back a reply to the request to inform the RCS-MF that the policies are accepted. In step 930, the RCS-MF sends an AS allocation request to the edge cloud. The edge cloud creates and initializes AS resources as requested in step 940 and sends a reply to the AS allocation request in step 950. The reply contains information on the created AS and the RCS-MF updates the database module with the information on AS. Next, in step 960, the RCS-MF sends AS connection request to the RCS-CF to ask the RCS-CF to set up connection to AS. This AS connection request includes the information on the AS to be connected. The RCS-CF sends a connection request to the target AS to set up a connection to the AS in step 970. Thereafter, in step 980 the AS sends back a reply to the edge cloud after the connection is set up and in turn the RCS-CF sends a reply to the RCS-MF in step 990 to inform RCS-MF that the connection is successfully set up. The RCS updates the database module with the information on the connection.

In some embodiments of the present disclosure, in addition to those AS management commands as illustrated hereinabove, the RCS may further dynamically manage RCS-CF, for example, transmit a calling function creation command to add new RCS-CF, transmit a calling function deletion command to delete RCS-CF, or transmit a calling function modification command to modify the RCS-CF when the RCS-CF deployment condition is met, not met, or the network condition changes. While in some other embodiments of the present disclosure, an RCS-CF could be deployed during initialization of the RCS-MF and exists for the whole life cycle of the RCS-MF.

Figure 10:
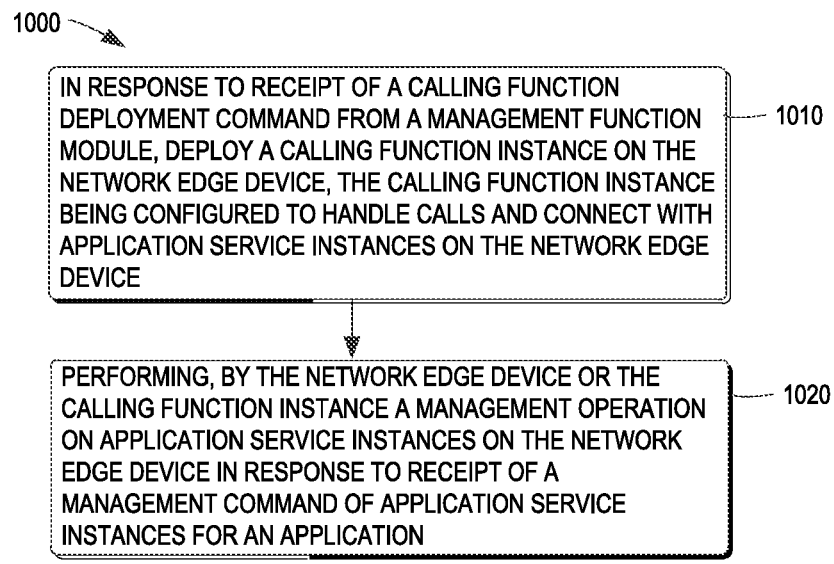
FIG. 10 schematically illustrates an example flow chart of a method of performing management operations related to application servers on network edge computing device according to some embodiments of the present disclosure.

FIG. 10 illustrates an example flow chart of a method of performing management operations related to application servers on network edge computing device according to some embodiments of the present disclosure. The method 1000 may be implemented at a network edge computing device like the edge cloud or other devices.

As illustrated in FIG. 10, first at block 1010, the edge cloud may deploy, in response to receipt of a calling function deployment command from a management function module such as the RCS-MF, a calling function instance on the network edge computing device. The calling function instance such as RCS-CF may be configured to connect with application servers for respective applications and handle communications between terminal devices and the application servers.

In order to dynamically manage resources for instances of AS, RCS-CF on the edge cloud, the edge cloud shall contain functionalities for handling calls and connecting to AS instances. Thus, during the initialization of the RCS-MF or upon detection of a predetermined RCS-CF deployment condition, a call function deployment command can be transmitted to the edge cloud to create one or more RCS-CF instances on the edge cloud.

In some embodiments of the present disclosure, the RCS-CF includes an SBC and an S-CSCF. The SBC is located between the RAN (like 5G RAN) and the IMS network and functions as an access point for the terminal device to access the IMS. The S-CSCF is responsible for the signaling control during session. Both AS instances on the edge cloud and AS instances on other network devices are connected to the S-CSCF so that a session could be established between a terminal device and a suitable AS instance. Thus, the SBC and the S-CSCF in RCS-CF could fulfil the goal of handling calls and connecting to AS. Upon receipt of the call function deployment command, the edge cloud allocates resources for an RCS-CF to create an RCS-CF instance including an SBC and an S-CSCF.

In some embodiments of the present disclosure, the RCS-CF could be provisioned with some predetermined management rules, for example those given in Table 1. In these embodiments, the RCS-CF could receive a call function configuration command containing the predetermined management policies, and in response to this, the call function instance will be configured with the predetermined management policies.

With the provided policies, the RCS-CF may monitor the network condition, and transmit a network condition notification to the management function module, when the network condition meets one of the predetermined management policies. Particularly, the RCS-CF could monitor the network condition, estimate latency for an application or a type of applications, and determine whether the network condition meets one of the predetermined management policies based on the estimated latency and the predetermined management policies. Thus, by means of the network condition notification, it could indicate the network condition meeting one of the predetermined management policies.

In block 1020, the edge cloud or RCS-CF could perform a management operation related to the application servers on the network edge computing device, in response to receipt of a management command for application servers on the network edge computing device. The management command may comprise one or more of: an application server allocation command, an application server de-allocation command, an application server modification command, a calling function deployment command, a calling function deletion command, a calling function modification command, an application server connection command, and calling function configuration command.

In some embodiments of the present disclosure, the edge cloud could add a new application server upon receipt of an application server allocation command from the management function module. In some embodiments of the present disclosure, the edge cloud could delete an application server upon receipt of an application server de-allocation command from the management function module. In some embodiments of the present disclosure, the edge cloud could modify an application server upon receipt of an application server modification command from the management function module. In some embodiments of the present disclosure, the edge cloud could add a new calling function instance in response to receipt of a calling function deployment command from the management function module. In some embodiments of the present disclosure, the edge cloud could delete a calling function instance in response to receipt of a calling function deletion command from the management function module. In some embodiments of the present disclosure, the edge cloud could modify a calling function instance in response to receipt of a calling function modification command from the management function module. In some embodiments of the present disclosure, the RCS-CF could perform a policy configuration upon receipt of a calling function configuration command containing the updated management policies from the management function module. In some embodiments of the present disclosure, the RCS-CF could connect an application server to the calling function instance upon receipt of an application server connection command from the management function module.

In some embodiments of the present disclosure, the edge cloud may add a new application server in response to receipt of an application server allocation command from the management function module, the RCS-CF may connect the application server to a calling function instance in response to receipt of an application server connection command from the management function module; and the edge cloud may further delete the application server in response to receipt of an application server de-allocation command from the management function module.

In some embodiments of the present disclosure, the edge cloud may add a new calling function instance in response to receipt of a calling function deployment command from the management function module, and the edge cloud may delete the calling function instance in response to receipt of a calling function deletion command from the management function module.

It shall be noted that some detailed operations at the edge cloud are already described together operations at the RCS-MF in conjunction with FIGS. 5 to 9 and thus for some details at the edge cloud, reference could be made to those descriptions given with reference to FIGS. 5 to 9.

Figure 11:
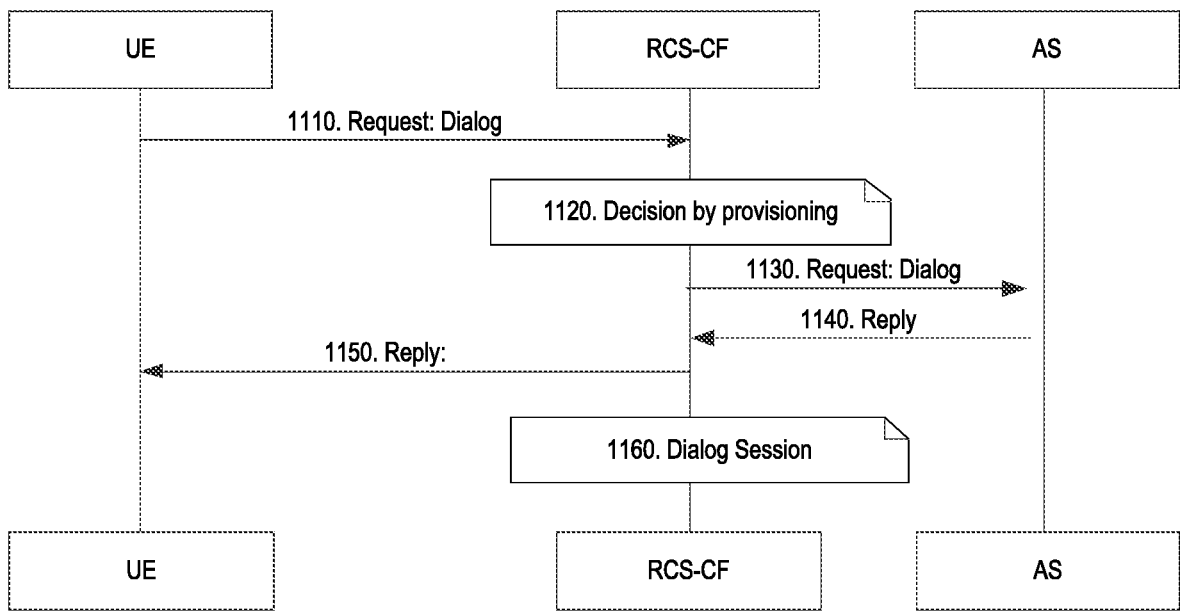
FIG. 11 schematically illustrates an example signaling flow chart of call handling according to some embodiments of the present disclosure.

For illustrative purposes, FIG. 11 illustrates an example signaling flow chart of call handling according to some embodiments of the present disclosure. First in step 1110, UE sends a request to start a dialog. In step 1120, the RCS-CF makes decision based on forwarding policies to determine the AS that the dialog request shall be forwarded to. In step 1130, the RCS-CF forwards the dialog request from the UE to a corresponding AS providing related services to set up a dialog. The corresponding AS may be AS created on the edge cloud, or AS on other network devices. The RCS-CF does not care about the location of the AS just forwards the request to a corresponding AS connected thereto. In step 1140, the AS sends a reply to the dialog request and the RCS-CF forwards the reply to the UE in step 1150. In step 1160, a call session is set up and thus the AS could provide services to the AS in the dialog session. From FIG. 11, it can be seen that the call flow of call handling is substantially to the existing call flow except that the RCS may make decision by provisioned policies and thus the solution proposed herein has a little effect on the existing call flow.

Embodiments of the present disclosure provide a new scheme of dynamically managing resources for instances, particularly for some applications with a strict latency requirement. In embodiments of the present disclosure, the AS for these instances could be created on the edge cloud and managed dynamically, and it could meet the strict latency requirements and utilize these resources efficiently since the edge cloud could offer a service environment with ultra-low latency and high-bandwidth as well as direct access to real-time radio network information. In turn, it could bring a better and enriched user experience for 5G application, especially those for interactive applications like AR/VR applications.

In some embodiments of the present disclosure, there is further provided an apparatus capable of performing the method 500, and the apparatus could be or function as for example, a management function module like the RCS-MF as proposed herein. The apparatus may comprise means for transmitting, to a network edge computing device, a calling function deployment command to deploy a calling function instance on the network edge computing device, the calling function instance being configured to connect with application servers for respective applications and handle communications between terminal devices and the application servers; and means for transmitting, to at least one of the network edge computing device and the calling function instance, a management command for application servers on the network edge computing device in response to a network condition meeting one of predetermined management policies.

In some embodiments of the present disclosure, the calling function instance may be configured with the predetermined management policies, and the apparatus further comprises means for receiving a network condition notification from the calling function instance on the edge cloud, the network condition notification indicating the network condition meeting the one of the predetermined management policies. In these embodiments of the present disclosure, the means for transmitting the management command may be configured to transmit the management command in response to the receiving of the network condition notification.

In some embodiments of the present disclosure, the means for transmitting the calling function deployment command may be further configured to transmit the calling function deployment command during initialization of the management function module.

In some embodiments of the present disclosure, the means for transmitting the calling function deployment command may be further configured to transmit the calling function deployment command when a predetermined deployment condition is detected.

In some embodiments of the present disclosure, the means for transmitting the calling function deployment command may be further configured to: transmit a call function creation command to the network edge computing device to create the calling function instance on the network edge computing device; and transmit a call function configuration command containing the predetermined management policies to the calling function instance to configure the call function instance with the predetermined management policies.

In some embodiments of the present disclosure, the means for transmitting the management command may be configured to perform one or more of: transmitting an application server allocation command to the network edge computing device to add a new application server; transmitting an application server de-allocation command to the network edge computing device to delete an application server; transmitting an application server modification command to the network edge computing device to modify an application server; transmitting a calling function creation command to the network edge computing device to add a new calling function instance; transmitting a calling function deletion command to the network edge computing device to delete new calling function instance; transmitting a calling function modification command to the network edge computing device to modify a calling function instance; transmitting an application server connection command to the calling function instance to connect an application server to a calling function instance; transmitting a calling function configuration command containing updated management policies to a calling function instance to configure the calling function instance with the updated management policies.

In some embodiments of the present disclosure, the means for transmitting the management command may be further configured to: transmit an application server allocation command to the network edge computing device to add a new application server in response to the network condition meeting an application server adding policy; transmit an application server connection command to the calling function instance to connect the added application server to the calling function instance in response to successful adding of the application server; and transmit an application server de-allocation command to the network edge computing device to delete the application server in response to the network condition meeting an application server deletion policy.

In some embodiments of the present disclosure, the means for transmitting the management command may be further configured to: transmit a calling function creation command to the network edge computing device to add a new calling function instance in response to the network condition meeting a calling function adding policy; and transmit a calling function deletion command to the network edge computing device to delete a calling function instance in response to the network condition meeting a calling function deletion policy.

In some embodiments of the present disclosure, the apparatus may further comprise: means for monitoring the network condition; means for estimating latency for an application or a type of application; and means for determining whether the network condition meets one of the predetermined management policies based on the estimated latencies and the predetermined management policies. In these embodiments, the means for monitoring the network condition, the means for estimating latency and the means for determining is contained in the management function module.

In some embodiments of the present disclosure, the means for monitoring the network condition, the means for estimating latency and the means for determining can be contained in a policy module in the management function module.

In some embodiments of the present disclosure, wherein the predetermined management policies may comprise one or more of a high traffic rate threshold for a particular type of applications; a low traffic rate threshold and a time limit for a particular type of applications; and a high latency threshold for a particular type of applications.

In some embodiments of the present disclosure, the apparatus may be implemented on the network edge computing device. In other embodiments of the present disclosure, the apparatus is implemented on another communication network communicable with a communication network having the network edge computing device.

In some embodiments of the present disclosure, the calling function instance may be a rich communication service (RCS) calling function instance, and the network edge computing device is an edge cloud on a generation radio access network.

In some embodiments of the present disclosure, there is further provided another apparatus for performing the method 1000, and the apparatus could be or function as for example a network edge computing device like edge cloud. The apparatus may include means for deploying, in response to receipt of a calling function deployment command from a management function module, a calling function instance on the network edge computing device, the calling function instance being configured to connect with application servers for respective applications and handle communications between terminal devices and the application servers; and means for performing, by the network edge computing device or the calling function instance, a management operation related to application servers on the network edge computing device in response to receipt of a management command for application servers on the network edge computing device from a management function module.

In some embodiments of the present disclosure, the calling function instance may be configured with predetermined management policies, the apparatus may comprise means for monitoring a network condition based on the predetermined management policies; and means for transmitting a network condition notification to the management function module, the network condition notification indicating the network condition meeting one of the predetermined management policies.

In some embodiments of the present disclosure, the means for monitoring a network condition may be further configured to monitor the network condition; estimate latency for an application or a type of applications; and determine whether the network condition meets one of the predetermined management policies based on the estimated latency and the predetermined management policies.

In some embodiments of the present disclosure, the means for deploying the calling function instance on the network edge computing device may comprise: means for creating, in response to receipt of a call function creation command from the management function module, the calling function instance on the network edge computing device; and means for configuring, in response to receipt of a call function configuration command containing the predetermined management policies, the created call function instance with the predetermined management policies.

In some embodiments of the present disclosure, the means for performing the management operation may be configured to perform any of: adding, by the network edge computing device, a new application server in response to receipt of an application server allocation command from the management function module; deleting, by the network edge computing device, an application server in response to receipt of an application server de-allocation command from the management function module; modifying, by the network edge computing device, an application server in response to receipt of an application server modification command from the management function module; adding, by the network edge computing device, a new calling function instance in response to receipt of a calling function deployment command from the management function module; deleting by the network edge computing device, a calling function instance in response to receipt of a calling function deletion command from the management function module; modifying, by the network edge computing device, a calling function instance in response to receipt of a calling function modification command from the management function module; connecting by the calling function instance, an application server to a calling function instance in response to receipt of an application server connection command from the management function module; configuring by the calling function instance, the calling function instance with updated management policies in response to receipt of a calling function configuration command containing the updated management policies from the management function module.

In some embodiments of the present disclosure, the means for performing the management operation may be further configured to: add a new application server in response to receipt of an application server allocation command from the management function module; connect the application server to a calling function instance in response to receipt of an application server connection command from the management function module; and delete the application server in response to receipt of an application server de-allocation command from the management function module.

In some embodiments of the present disclosure, the means for performing the management operation may be further configured to: add a new calling function instance in response to receipt of a calling function deployment command from the management function module; and delete the calling function instance in response to receipt of a calling function deletion command from the management function module.

In some embodiments of the present disclosure, the predetermined management policies may comprise one or more of: a high traffic rate threshold for a particular type of applications; a low traffic rate threshold and a time limit for a particular type of applications; and a high latency threshold for a particular type of applications.

In some embodiments of the present disclosure, the management function module may be implemented on one of the network edge computing device or another communication network communicable with a communication network having the network edge computing device.

In some embodiments of the present disclosure, the calling function instance is a rich communication service (RCS) calling function instance, and the network edge computing device is an edge cloud on a radio access network.

Figure 12:
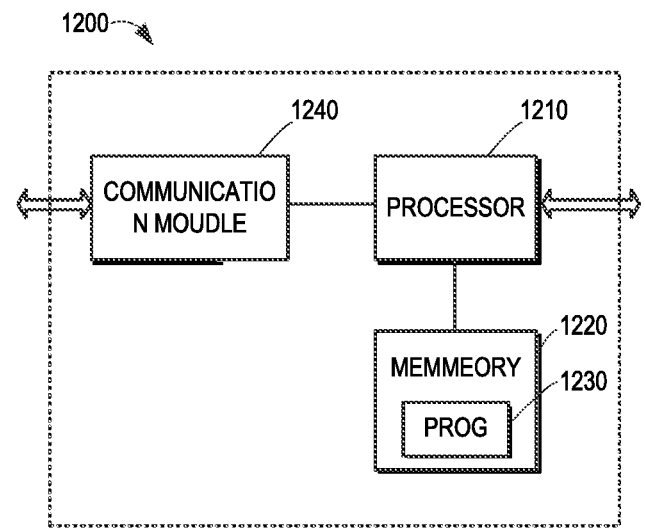
FIG. 12 schematically illustrates a simplified block diagram of a device that is suitable for implementing embodiments regarding application server management of the present disclosure.

FIG. 12 is a simplified block diagram of a device 1200 that is suitable for implementing embodiments of the present disclosure. The device 1200 can be implemented at or as at least a part of a network device in the 5G RAN 220 or the core network 230 as shown in FIGS. 2A and 2B.

As shown, the device 1200 includes a processor 1212, a memory 1220 coupled to the processor 1210, a communication module 1240 coupled to the processor 1210, and a communication interface (not shown) coupled to the communication module 1240. The memory 1210 stores at least a program 1230. The communication module 1240 is for bidirectional communications. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a UE.

The program 1230 is assumed to include program instructions that, when executed by the associated processor 1210, enable the device 1200 to operate in accordance with the embodiments of the present disclosure, as discussed herein with reference to FIGS. 5-9. The embodiments herein may be implemented by computer software executable by the processor 1210 of the device 1200, or by hardware, or by a combination of software and hardware. The processor 1210 may be configured to implement various embodiments of the present disclosure.

The memory 1210 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1210 is shown in the device 1200, there may be several physically distinct memory modules in the device 1200. The processor 1210 may be of any type suitable to the local technical network, and may include one or more of general purpose computers, special purpose computers, microprocessors, digital signal processors (DSPs) and processors based on multicore processor architecture, as non-limiting examples. The device 1200 may have multiple processors, such as an application specific integrated circuit chip that is slaved in time to a clock which synchronizes the main processor.

Figure 13:
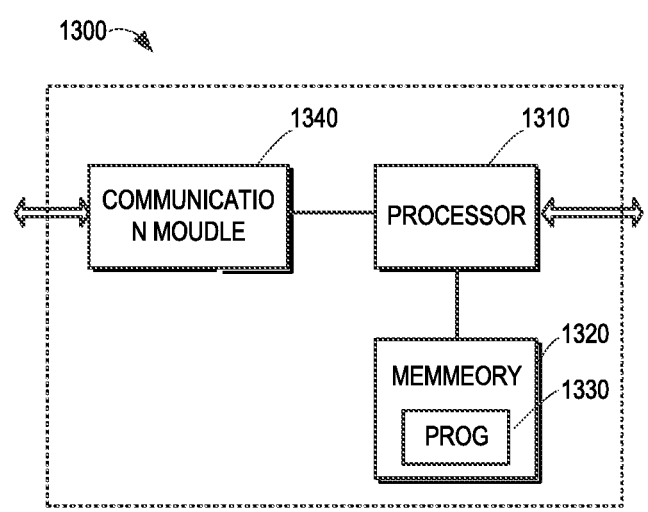
FIG. 13 schematically illustrates a simplified block diagram of a device that is suitable for implementing embodiments regarding management operation performing of the present disclosure.

FIG. 13 illustrates a simplified block diagram of a device 1300 that is suitable for implementing embodiments of the present disclosure. The device 1300 can be a network edge computing device like edge cloud 221, and implemented at or as at least a part of a network device in the 5G RAN 220 as shown in FIGS. 2A and 2B.

As shown, the device 1300 includes a processor 1310, a memory 1320 coupled to the processor 1310, a communication module 1340 coupled to the processor 1310, and a communication interface (not shown) coupled to the communication module 1340. The memory 1310 stores at least a program 1330. The communication module 1340 is for bidirectional communications. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a UE.

The program 1330 is assumed to include program instructions that, when executed by the associated processor 1310, enable the device 1300 to operate in accordance with the embodiments of the present disclosure, as discussed herein with reference to FIG. 10. The embodiments herein may be implemented by computer software executable by the processor 1310 of the device 1300, or by hardware, or by a combination of software and hardware. The processor 1310 may be configured to implement various embodiments of the present disclosure.

The memory 1310 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1310 is shown in the device 1300, there may be several physically distinct memory modules in the device 1300. The processor 1310 may be of any type suitable to the local technical network, and may include one or more of general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

Figure 14:
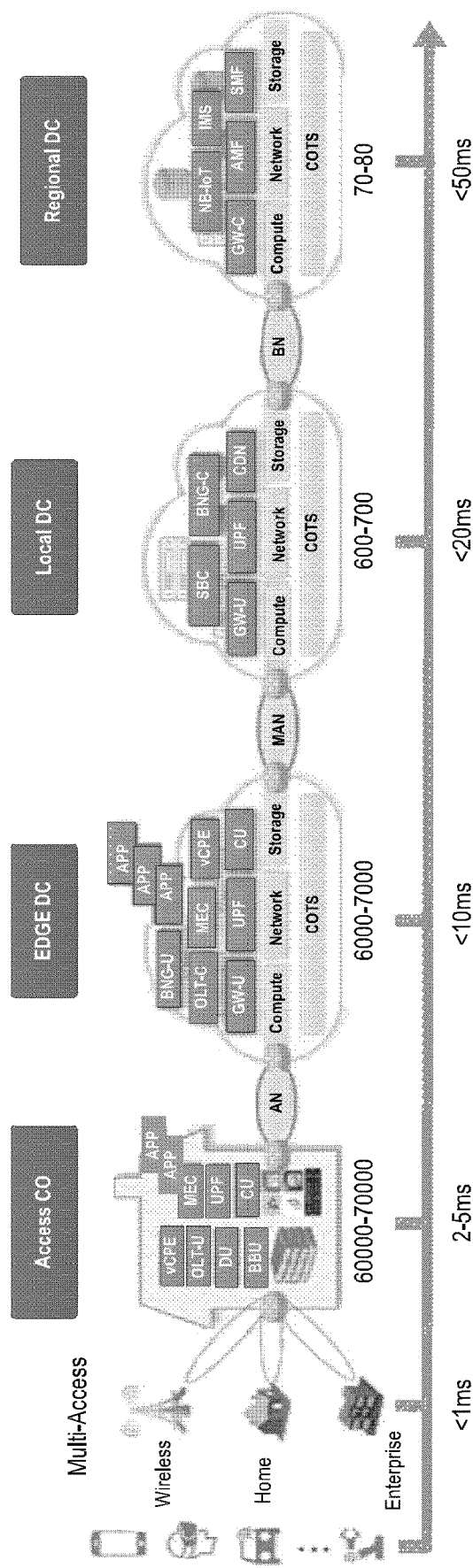
FIG. 14 illustrates an example cloud-based network architecture which provides a network edge computing device for implementing embodiments of the present disclosure.

FIG. 14 illustrates an example cloud-based network architecture which provides a network edge computing device for implementing embodiments of the present disclosure. As illustrated in FIG. 14, the example cloud-based network architecture includes four layers, an access Central Office (CO) layer, an edge Data Center (DC) layer, a local DC layer and a regional DC layer. As illustrated. at the access CO, the edge DC, the local DC and the regional DC, it could respectively achieve latencies of 2 to 5 ms, less than 10 ms, less than and less than 50 ms. Thus, embodiments of the present disclosure could be implemented on both edge DC and access CO to support applications like video monitoring, AI analysis, AR, live VR broadcast, etc. In addition, by means of such edge cloud, it is possible to provide unified API for application development and bring flexibility to implement embodiments of the present disclosure, such as RCS-MF, RCS-CF, AS, etc.

The architecture illustrated in FIG. 14 was proposed by China Unicorn Corporation and other vendors like AT&T also have started preparing and implementing edge infrastructure. The example architecture is only given for illustrative purposes and the present disclosure is not limited thereto. In fact, embodiments of the present disclosure could be implemented in an edge cloud in different network architecture.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 600 as described above with reference to FIGS. 6-9. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method, comprising:
    at a management function module,
    transmitting, to a network edge computing device, a calling function deployment command to deploy a calling function instance on the network edge computing device, the calling function instance being configured to connect with application servers for respective applications and handle communications between terminal devices and the application servers; and
    transmitting, to at least one of the network edge computing device and the calling function instance, a management command for application servers on the network edge computing device in response to a network condition meeting one of predetermined management policies, wherein the calling function instance is configured with the predetermined management policies, the method further comprises:
    receiving a network condition notification from the calling function instance on an edge cloud, the network condition notification indicating the network condition meeting the one of the predetermined management policies,
    wherein transmitting the management command comprising transmitting the management command in response to the receiving of the network condition notification.

2. The method of claim 1, wherein transmitting the calling function deployment command comprises transmitting the calling function deployment command during initialization of the management function module, or when a predetermined deployment condition is detected.

3. The method of claim 1, wherein transmitting the calling function deployment command further comprises:
    transmitting a call function creation command to the network edge computing device to create the calling function instance on the network edge computing device; and
    transmitting a call function configuration command containing the predetermined management policies to the calling function instance to configure the call function instance with the predetermined management policies.

4. The method of claim 1, wherein transmitting the management command comprises one or more of:
    transmitting an application server allocation command to the network edge computing device to add a new application server;
    transmitting an application server de-allocation command to the network edge computing device to delete an application server;
    transmitting an application server modification command to the network edge computing device to modify an application server;
    transmitting a calling function creation command to the network edge computing device to add a new calling function instance;
    transmitting a calling function deletion command to the network edge computing device to delete a calling function instance;
    transmitting a calling function modification command to the network edge computing device to modify a calling function instance;
    transmitting an application server connection command to the calling function instance to connect an application server to the calling function instance;
    transmitting a calling function configuration command containing updated management policies to a calling function instance to configure the calling function instance that the calling function configuration command is transmitted to with the updated management policies.

5. The method of claim 1, wherein transmitting the management command comprises:

transmitting an application server allocation command to the network edge computing device to add a new application server in response to the network condition meeting an application server adding policy;

transmitting an application server connection command to the calling function instance to connect the added application server to the calling function instance in response to successful adding of the new application server; and transmitting an application server de-allocation command to the network edge computing device to delete the new application server in response to the network condition meeting an application server deletion policy.

6. The method of claim 1, wherein transmitting the management command comprises:

transmitting a calling function creation command to the network edge computing device to add a new calling function instance in response to the network condition meeting a calling function adding policy; and transmitting a calling function deletion command to the network edge computing device to delete a calling function instance in response to the network condition meeting a calling function deletion policy.

7. The method of claim 1, wherein the calling function instance is a rich communication service (RCS) calling function instance, and the network edge computing device is an edge cloud on a radio access network.

8. An apparatus for managing application servers, comprising:

a policy module configured to make management policies for respective applications and store the management policies;

a storage module, configured to store information on at least one of a network edge computing device, a calling function instance created on the network edge computing device, and application servers on the network edge computing device;

a communication module, configured to provide application interfaces to at least one of the network edge computing device, the calling function instance, and application servers on the network edge computing device; and an execution logic module, configured to communicate with the policy module, the storage module and the communication module, and manage life cycles for application servers on the network edge computing device by performing actions according to a method according to claim 1.

9. A device, comprising:

at least one processor; and at least one memory including computer program code;

the at least one memory and the computer program code configured to, with the at least one processor, cause the device to perform actions according to claim 1.

10. A non-transitory computer readable storage medium storing a computer program thereon, the computer program, when executed by a processor, causing the processor to carry out the method according to claim 1.

11. A method, comprising:

at a network edge computing device, deploying, in response to receipt of a calling function deployment command from a management function module, a calling function instance on the network edge computing device, the calling function instance being configured to connect with application servers for respective applications and handle communications between terminal devices and the application servers;

performing, by the network edge computing device or the calling function instance, a management operation related to application servers on the network edge computing device in response to receipt of a management command for application servers on the network edge computing device from the management function module, wherein the calling function instance is configured with predetermined management policies, the method further comprises further comprises:

monitoring, by a calling function module, a network condition based on the predetermined management policies;

transmitting, by the calling function module, a network condition notification to the management function module from which the calling function deployment command is received, the network condition notification indicating the network condition meeting one of the predetermined management policies.

12. The method of claim 11, wherein the monitoring the network condition based on the predetermined management policies further comprises, by the calling function module:

monitoring the network condition;

estimating latency for an application or a type of applications; and determining whether the network condition meets one of the predetermined management policies based on the estimated latency and the predetermined management policies.

13. The method of claim 11, wherein deploying the calling function instance on the network edge computing device comprises:

creating, in response to receipt of a call function creation command from the management function module from which the calling function deployment command is received, the calling function instance on the network edge computing device; and configuring, in response to receipt of a call function configuration command containing the predetermined management policies, the created call function instance with the predetermined management policies.

14. The method of claim 11, wherein performing the management operation comprises one or more of:

adding, by network edge computing device, a new application server in response to receipt of an application server allocation command from the management function module from which the calling function deployment command is received;

deleting, by network edge computing device, an application server in response to receipt of an application server de-allocation command from the management function module from which the calling function deployment command is received;

modifying, by network edge computing device, an application server in response to receipt of an application server modification command from the management function module from which the calling function deployment command is received;

adding, by network edge computing device, a new calling function instance in response to receipt of a calling function deployment command from the management function module from which the calling function deployment command is received;

deleting, by network edge computing device, the calling function instance in response to receipt of a calling function deletion command from the management function module;

modifying, by network edge computing device, the calling function instance in response to receipt of a calling function modification command from the management function module from which the calling function deployment command is received;

connecting, by the calling function instance on the network edge computing device, an application server to the calling function instance in response to receipt of an application server connection command from the management function module from which the calling function deployment command is received;

configuring, by the calling function instance on the network edge computing device, the calling function instance with updated management policies in response to receipt of a calling function configuration command containing the updated management policies from the management function module from which the calling function deployment command is received.

15. The method of claim 11, wherein the calling function instance is a rich communication service (RCS) calling function instance, and the network edge computing device is an edge cloud on a radio access network.

16. An apparatus for performing management operations related to application servers, comprising:
   a communication module configured to provide an application interface to a management function module;
   a command execution module, configured to communicate with the communication module, and perform management operations related to application servers on the network edge computing device by performing actions according to a method according to claim 11.

17. A device, comprising:
   at least one processor; and
   at least one memory including computer program code;
   the at least one memory and the computer program code configured to, with the at least one processor, cause the device to perform actions according to claim 11.

18. A non-transitory computer readable storage medium storing a computer program thereon, the computer program, when executed by a processor, causing the processor to carry out the method according to claim 11.

* * * * *